Nov. 24, 1964 R. J. DENEEN, JR., ETAL 3,158,791

ENERGY RECOVERY COIL DRIVER

Filed Oct. 4, 1962

INVENTORS.
RAYMOND J. DENEEN, JR.
FRANK H. HEISSENBUTTEL, 3RD
KENNETH E. WOOD
BY H. H. Losche
ATT'YS.

3,158,791

ENERGY RECOVERY COIL DRIVER

Raymond J. Deneen, Jr., and Frank H. Heissenbuttel III, Baltimore, and Kenneth E. Wood, Severna Park, Md., assignors, by mesne assignments, to the United States of America as represented by the Secretary of the Navy Filed Oct. 4, 1962, Ser. No. 228,508
9 Claims. (Cl. 317—148.5)

This invention relates to the recovery of energy from inductive circuits and more particularly to the recovery of energy from coil driver relay circuits, or other inductive circuits, to reduce both the average and peak power requirements in the switching applications of these inductive circuits.

In the use of inductive circuits there is a considerable expenditure of energy to energize the inductive elements of these circuits and, when these inductive circuits are interrupted, the energy must be returned to the circuit or be otherwise dissipated. In switching applications of inductive circuits, such as relay circuits or the like, the energy stored in an inductor is often purposely dissipated when the switch is opened by separate switch means connecting the inductive circuit across a resistor, or by a diode shunted across the inductive element. Without such energy dissipating means the energy in the inductive circuit often arcs across any control switch as it is opened producing a dissipation of the energy into heat. This usually is damaging to the switch contacts and may be damaging to other elements of the inductive circuit by the surging currents. If many inductive means or coils are being driven or the energy stored in the inductive means during a cycle of energization is large compared with the energy dissipated in this system during the cycle, the power supply requirements can be materially reduced if this magnetic field energy could be recovered.

In the present invention, whenever a primary circuit has an inductive means, such as a relay therein to be operated, this inductive means is made mutually inductive to a secondary inductive means in a recovery circuit to return the energy to the initial energy supplying source. In this invention an illustration of use shows a primary inductive circuit with a transistor switching means therein to switch the inductive energy on and off to the inductive means, and a secondary recovery circuit utilizes a transistor switching means for switching the secondary circuit on and off in a co-ordination with the primary energizing circuit to return the energy to the energy source of supply. In the illustrated example a storage capacitor is coupled in parallel with a high voltage source through a current limiting resistor which capacitor builds up and stores the energy substantially equal to the high voltage source ready for initial energization of the inductive circuit. The storage capacitor is placed in parallel with the inductive element of the primary circuit and the transistor switching means is in series with the inductive element of the primary circuit. The primary circuit is also coupled to a low voltage supply which is separated from the high voltage supply by a diode. Whenever the transistor switching means is made conductive, the storage capacitor readily energizes the inductive means and reduces in voltage amplitude to the low voltage supply amplitude which thereafter maintains energization of the inductive means sufficient for its intended purpose. Prior to the opening of the primary circuit the transistor of the recovery circuit is forward biased so that as soon as the primary circuit is opened the collapsing field of the inductive means in the primary circuit induces energy into the inductive means of the recovery circuit to return this energy to the storage capacitor. As is well known, there are some losses incurred in recovering the transfer of energy, but the greater part of this energy is returned to the storage capacitor which thereafter returns slowly to the energy level of the high voltage source. A circuit of this invention utilizing a storage capacitor can be adapted to supply more than one initial inductive circuit, or to supply two inductive circuits which may be alternately switched to oppositely polarize the inductive means on a mutually inductive core, or the like. In like manner the single storage capacitor could be used to supply two or more primary and recovery circuit pairs of mutually inductive means therefor by each primary and recovery circuit pair being magnetically separate from the other. It is therefore a general object of this invention to provide energy recovery circuits for inductive driver circuits to reduce the average and peak power requirements in the energization of these inductive circuits.

These and other objects and the many attendant advantages and features of this invention will become more apparent to those skilled in the art as the description proceeds when considered along with the drawing illustrating the invention in which.

Figure 1:
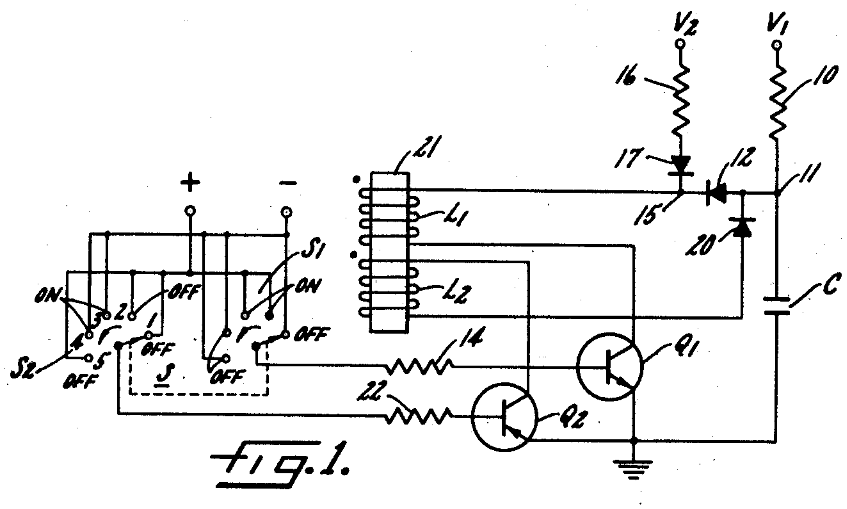
FIGURE 1 is an electrical schematic showing a primary inductive coil driving circuit and a recovery circuit having the inductive means of the primary and recovery circuits mutually conductive.

Referring more particularly to FIGURE 1, a high voltage source V1 is coupled across a storage capacitor C through a current limiting resistance 10. The high voltage source V1 is coupled to the upper plate 11 of capacitor C providing, for example, a positive potential, the opposite plate of the storage capacitor C being coupled to the other terminal of the V1 source, herein illustrated as being zero or ground potential. The storage capacitor C is coupled in parallel with an inductance L1, this inductance being in series with a diode 12 and a switching transistor Q1. The circuit from the terminal 11 through the diode 12, the inductance L1, and the transistor Q1 to ground establishes the primary inductive circuit. The transistor Q1 is of the N-P-N type having its emitter and collector coupled into the primary circuit and its base coupled through a resistor 14 to the switchable blade of a switch S1 in a composite switch S, soon to be described. Coupled to the primary circuit at a terminal point 15 is a second voltage source V2 through a current limiting resistor 16 and a diode 17. The voltage source V2 is lower than the voltage source V1 but is sufficient to maintain sufficient current flow through the inductive means L1 to accomplish the purpose thereof, such as to hold electrical contacts in contact position in a relay switch device.

An energy recovery circuit is established from the terminal point 11 to ground in parallel with the storage capacitor C. This energy recovery circuit includes a second inductive means L2 in series with a diode 20 and a transistor Q2. The inductive means L1 and L2 are herein represented as being coils wound on a common core 21 and wound to provide the same polarity relation as shown by the dots adjacent each inductive coil. The transistor Q2 is of the P-N-P type having its emitter and collector connected in the recovery circuit. The base of the transistor Q2 is coupled through a resistor 22 to the switch blade of a switch S2 in the composite switch S. The diodes 12 and 17 have their cathodes coupled in common to one lead of the inductive coil L1 while the diode 20 has its cathode coupled to the terminal 11 of the storage capacitor C. The circuit just described provides an illustrated example of the energy recovery circuit for a coil driving circuit which could be multiplied or duplicated for various applications as will be more particularly brought to light in the description of other modifications shown in the remaining figures of the drawing. For a better understanding of the means of recovering energy from a coil driving circuit, a description of operation will be given for FIGURE 1 before proceeding to the description of other modifications of this circuit.

*Operation*

In the operation of the device as shown in FIGURE 1, let it be assumed that the composite switch S is in the position shown in which switches S1 and S2 are in the "off" position. Under this condition the storage capacitor C will charge to the voltage of V1 through the current limiting resistor 10 so that a voltage across the plates of capacitor C is substantially at the amplitude of the voltage of V1. Since the base emitter junction of Q1 is cut off, the transistor Q1 will be in its quiescent or nonconducting state and no current will flow in the inductive coil L1. The recovery circuit is likewise in a nonconducting state since transistor Q2 is likewise cut off. When it is desired to energize the inductive means L1 for the purpose of switching a relay or of activating other well known inductive means, the composite switch S is moved counterclockwise to the second tap which forward biases transistor Q1 but not the transistor Q2. This closes the primary circuit through the inductive means L1 which is immediately energized by current from the high voltage stored in the storage capacitor C conducted through the diode 12 and transistor Q1. Where the inductive means L1, 21 is used as a relay for switching purposes, the storage capacitor C supplies the high voltage necessary for fast initial switching by immediate energization of the inductive coil L1. When the transistor Q1 conducts, L1 and C resonate transferring the energy of the storage capacitor, being the equivalent of $\frac{1}{2}CV_1^2$ watt seconds or joules, to the inductive coil L1, being equal to $\frac{1}{2}Li^2$ watt seconds or joules of energy, where L is the inductance in Henries and *i* is the current in amperes. When the voltage of the storage capacitor C falls to the voltage V2, the necessary biasing current has been reached and the resistance 16 will thereafter clamp or limit the current through the inductive coil L1 provided by V2. The voltage of V2 is made low in order to reduce the power dissipated in the series resistance 16. As long as the magnetic field established in the core member 21 by the current through the inductive coil L1 is needed, the composite switch S is maintained on the second tap counterclockwise in FIGURE 1. Prior to interrupting the current in L1, the base of transistor Q2 is forward biased by turning the composite switch S to the third tap counterclockwise at which time both transistors Q1 and Q2 are forward biased. Q2 remains quiescent however since Q1 is still conducting and there is no change produced in the magnetic field by the steady current through the coil L1. Transistor Q2 remains in its quiescent state because there is no voltage difference between its collector and emitter. When transistor Q1 is turned off by switching the composite switch S to the fourth position counterclockwise, the magnetic field in the coil L1 will collapse and induce a current in the recovery coil L2 establishing a circuit through the transistor Q2, through the diode 20, and across the storage capacitor C in the positive direction recovering, for the most part, the energy initially applied by capacitor C to the inductive coil L1. After the electromotive force in the inductive coil L2 decays, the transistor Q2 stops conducting and the base of this transistor Q2 is purposely back biased by activation of the composite switch S in the counterclockwise direction to its fifth contact, this fifth contact of switch S2 being supplied a positive voltage as shown. In this manner the energy in the storage capacitor C to initially energize the relay coil L1 is recovered whenever the coil L1 is de-energized and the magnetic field collapses to induce an electromotive force in the coil L2 placing this induced voltage across the storage capacitor C thereby recovering the initial excitation voltage, normal heat and flux line losses being excepted. The composite switch could be manually or automatically actuated to provide a fast sequence of positions in the manner explained by any suitable switch means.

Figure 2:
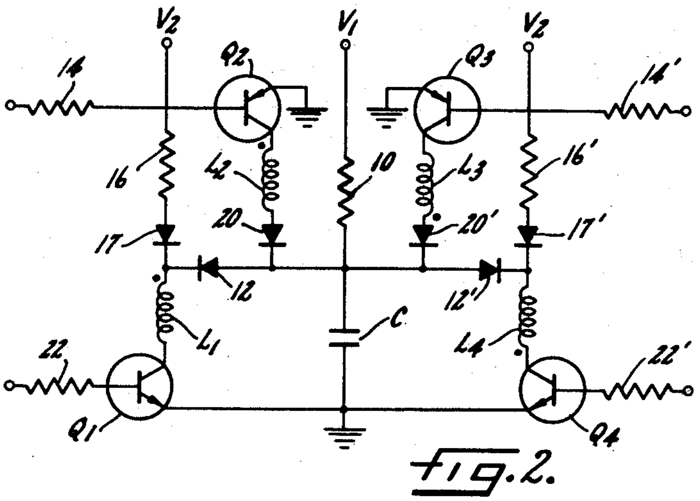
FIGURE 2 illustrates a modification of the invention in which two pairs of primary and recovery circuits are coupled to a single energy storage means in which the inductive means are mutual but each pair of mutual primary and recovery inductive means are oppositely polarized.
Figure 3:
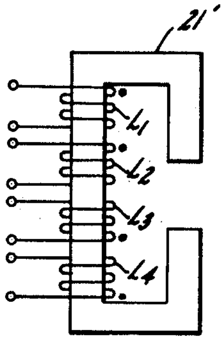
FIGURE 3 illustrates one means of mutual inductance for the two pairs of inductive means in FIGURE 2 arranged for opposite polarity.

Referring more particularly to FIGURES 2 and 3, the circuit of FIGURE 1 is duplicated in two symmetrical circuits with the exception that the storage capacitor C and the voltage source V1 are common to both circuits. Like elements of FIGURES 1 and 2 bear the same reference characters with the reference characters primed in the right half of FIGURE 2 since the circuit of FIGURE 2 is symmetrical. The inductive coils L1, L2, L3, and L4 are placed on a common core 21′, as shown in FIGURE 3, the coils L1 and L2 being of one polarization and the coils L3 and L4 being of opposite polarization as shown by the dots so that either the right half or the left half of the circuit shown in FIGURE 2 may be operative to energize the core 21′ in one polarity or the other. Each right half or left half of the circuit shown in FIGURE 2 is operative in the same manner as shown and described for that of FIGURE 1, this operability being a choice of the operator to polarize the core member 21′ in one direction or the other. It is to be understood that the inductive coils L1 or L4 are energized alternately since the energization of both at the same time would nullify the electromagnetic energy in the core member 21′ unless the electrical turns or currents were different. The circuit shown in FIGURES 2 and 3 may be useful in energy recovery circuits for driving relay means in which alternating polarities are required.

Figure 4:
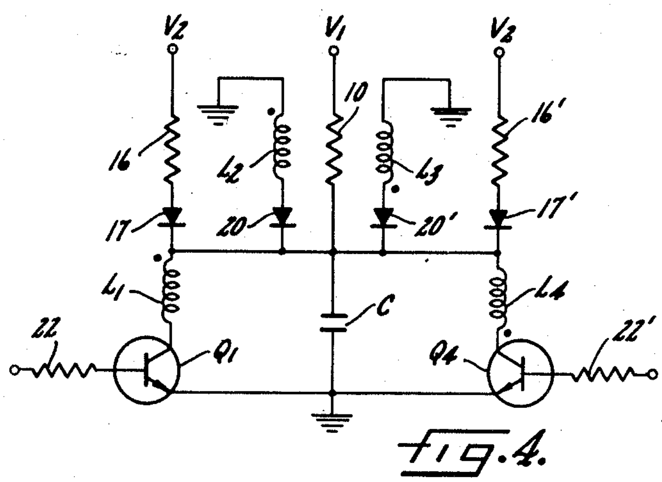
FIGURE 4 illustrates another modification of the invention in which the two pairs of inductive means in the primary and recovery circuits are magnetically separate.

Referring more particularly to FIGURE 4, like reference characters are applied to like parts where they are used in the same manner in FIGURES 1 and 2. The circuit of FIGURE 4 illustrates another embodiment of the invention in which transistors Q2 and Q3 can be eliminated when the inductive coils L1 and L2 are mutally inductive on one core and the coil L3 and L4 are mutually inductive on a separate core. In the operation of the circurt shown in FIGURE 4, the inductive coils L1 and L4 may be switched "on" by the transistors Q1 and Q4, respectively, at the same time or at different times as desired and the recovery circuit through the inductive coils L2 and L3, respectively, will recover and restore a greater part of the initial energy induced in coils L1 and L4, respectively, in the same manner as described in the operation of FIGURE 1. The diodes 20 and 20′ prevent any reverse currents from flowing in the recovery circuits through the inductive coil L2 and L3, respectively, upon the energization of the primary circuits through L1, Q1 and L4, Q4, respectively, but upon the collapse of the fields of L1 and L4, the induced electromotive forces in L2 and L3, respectively, will be returned through the respective diode 20 and 20′ to recharge the storage capacitor C to near its high voltage value of V1.

As shown and described for these figures, it is believed to be readily understood that the greater part of the energy used to initially energize the primary circuit and the primary coils L1 or L4 can be recovered through the recovery circuits to the storage capacitor whenever the primary circuit is interrupted. It is also believed to be readily understood that the transistor Q2 in FIGURE 1 could be eliminated in the manner shown and described for the circuit of FIGURE 4 wherever expedient or desirable. By using such a recovery circuit, the average power drawn from the supply voltage V1 is substantially reduced and likewise the peak current drawn from the high voltage supply V1 will be greatly reduced. Again, the N-P-N and P-N-P type transistors used as shown in the several figures herein could be reversed where polarity changes in the constructional details and features of this invention are required or desired without changing the conception of this invention.

While many modifications and changes may be made as illustrated in the several figures, it is to be understood that we desire to be limited in the spirit and scope of our invention only by the scope of the appended claims.

We claim:

1. A circuit for driving inductive means and for recovering the driving energy therefrom comprising:
   two mutually inductive means magnetically coupled in a uniform polarized manner;
   a storage means;
   a primary circuit coupled through one of said mutually inductive means and in parallel with said storage means, said primary circuit having said one of said mutually inductive means, a unidirectional means, and a switch means in series;
   a secondary circuit coupled through the other of said mutually inductive means and in parallel with said storage means, said secondary circuit having said other of said mutually inductive means and a unidirectional means in series; and
   a voltage means coupled to said storage means for charging same to establish conduction when said primary circuit switch means is closed whereby energy induced in said one of said mutually inductive means from said storage means when said primary circuit is closed will be induced in said other of said mutually inductive means when said primary circuit is opened to restore a substantial portion of the energy to said storage means.

2. A circuit as set forth in claim 1 wherein said storage means is a capacitor,
   said two mutually inductive means are coils on a common core,
   said switch means is a transistor having emitter and collector electrodes in the primary circuit and a base elctrode adaptable to be biased to switch said transistor into conduction and nonconduction states, and
   said unidirectional means of said primary circuit is a diode.

3. A circuit as set forth in claim 2 wherein
   said unidirectional means in said secondary circuit includes a diode oriented to conduct current from said other of said two mutually inductive coils to said capacitor to recharge same, and
   said diode in said primary circuit is oriented to conduct current from said capacitor to said one of said two mutually inductive coils.

4. A circuit for driving inductive means and for recovering the driving energy therefrom comprising:
   two pairs of mutually inductive means, each pair having coils wound on a core in a uniform polarized manner, and the polarity of one pair being opposite the polarity of the other pair;
   a storage capacitor in series with a loading resistor, said series coupling being in parallel with a high voltage source;
   a primary circuit for each pair of inductive means in parallel with said storage capacitor, said primary circuit of each pair of inductive means having one of said inductive means, a unidirectional means, and a transistor in series therein;
   a secondary circuit for each pair of inductive means in parallel with said storage means, each secondary circuit having the other of said inductive means of each of said pairs of inductive means and a unidirectional means in series therein; and
   a low voltage source coupled through a resistor and a unidirectional means to each primary circuit to establish an energization current when said primary circuit transistor is conductive whereby energy from said storage capacitor used to initially energize the inductive means in said primary circuit of each pair of inductive means is induced in the inductive means of said secondary circuit of said pair of inductive means upon primary circuit interruption to return substantially all said energy to said storage capacitor.

5. A circuit as set forth in claim 4 wherein
   said primary circuits of said two pairs of mutually inductive means are each alternately energizable to produce alternate polarities of said core.

6. A circuit as set forth in claim 5 wherein
   said transistor in each primary circuit has a base electrode adaptable to be controlled to switch said transistor to conduction and nonconduction states, said transistor in its conduction state establishing a closed primary circuit to energize said inductive means therein.

7. A circuit as set forth in claim 6 wherein
   said unidirectional means in said secondary circuits each includes a crystal diode and a transistor in series, said transistor having a base electrode adaptable to be controlled to place said transistor in conductive and nonconductive states to thereby close and open said secondary circuit, respectively.

8. A circuit for driving inductive means and for recovering the driving energy therefrom comprising:
   a first inductive means to be energized and de-energized;
   an energy storage means coupled in a primary circuit in parallel with said first inductive means;
   a unidirectional current means and a transistor switching means in series in said primary circuit to conduct current through said first inductive means in only one direction and to switch said primary circuit into conduction and nonconduction by said transistor;
   a second inductive means mutually coupled magnetically with said first inductive means and coupled in a secondary circuit with said energy storage means;
   a unidirectional current means in said secondary circuit to permit current to flow in only one direction;
   a high voltage supply coupled to be applied across said energy storage means, said coupling having a current limiting resistor serially therein; and
   a low voltage supply coupled to said primary circuit to be applied across said first inductive means, said primary circuit unidirectional means, and said transistor switching means, said low voltage coupling having a resistor and a unidirectional means in series therein to maintain low voltage energization of said first inductive means after initial energization from said energy storage means whereby switching of said primary circuit into a conductive state by said transistor produces immediate high voltage initial energization of said first inductive means by said energy storage means, this high voltage energy being recovered upon de-energization of said first inductive means by mutual induction through said second inductive means into said secondary circuit to said energy storage means.

9. A circuit as set forth in claim 8 wherein
   said unidirectional current means in said secondary circuit includes a diode and a transistor switching means in series to conduct current in a direction to charge said energy storage means and to switch said secondary circuit in co-ordination with said primary circuit thereby recovering the energy initially used to energize said first inductive means.

References Cited by the Examiner

UNITED STATES PATENTS

| | | | |
|---|---|---|---|
| 2,507,226 | 5/50 | Siezen | 320—1 |
| 2,887,592 | 5/59 | Stout et al. | 317—151 X |
| 2,920,259 | 1/60 | Light | 321–2 |

SAMUEL BERNSTEIN, *Primary Examiner.*

UNITED STATES PATENT OFFICE
CERTIFICATE OF CORRECTION

Patent No. 3,158,791 November 24, 1964

Raymond J. Deneen, Jr., et al.

It is hereby certified that error appears in the above numbered patent requiring correction and that the said Letters Patent should read as corrected below.

Column 5, line 3, strike out "in the constructional details and features of this invention" and insert the same after "made" in line 6, same column 5.

Signed and sealed this 20th day of April 1965.

(SEAL)
Attest:

ERNEST W. SWIDER
Attesting Officer

EDWARD J. BRENNER
Commissioner of Patents